(12) United States Patent
Tokhtuev et al.

(10) Patent No.: US 8,069,719 B2
(45) Date of Patent: Dec. 6, 2011

(54) GEAR FLOW METER WITH OPTICAL SENSOR

(75) Inventors: Eugene Tokhtuev, Duluth, MN (US);
Christopher Owen, Duluth, MN (US);
Anatoly Skirda, Hermantown, MN (US); Viktor Slobodyan, Duluth, MN (US); Richard Mehus, Richfield, MN (US)

(73) Assignee: Ecolab USA Inc., Saint Paul, MN (US)

( * ) Notice: Subject to any disclaimer, the term of this patent is extended or adjusted under 35 U.S.C. 154(b) by 62 days.

(21) Appl. No.: 12/369,501

(22) Filed: Feb. 11, 2009

(65) Prior Publication Data

US 2010/0199758 A1 Aug. 12, 2010

(51) Int. Cl.
*G01F 3/04* (2006.01)
(52) U.S. Cl. ........................................... 73/261
(58) Field of Classification Search .................. None
See application file for complete search history.

(56) References Cited

U.S. PATENT DOCUMENTS

| | | | | | |
|---|---|---|---|---|---|
| 3,633,420 | A | * | 1/1972 | Holzem | 73/199 |
| 3,759,099 | A | * | 9/1973 | McGregor | 73/861.53 |
| 4,209,258 | A | * | 6/1980 | Oakes | 366/138 |
| 4,337,655 | A | * | 7/1982 | Sundstrom et al. | 73/861.03 |
| 4,410,949 | A | * | 10/1983 | Huellinghorst et al. | 705/413 |
| 4,431,690 | A | | 2/1984 | Matt et al. | |
| 4,440,030 | A | * | 4/1984 | Pounder et al. | 73/861.87 |
| 4,878,454 | A | * | 11/1989 | Cann | 118/663 |
| 4,996,888 | A | * | 3/1991 | Foran et al. | 73/261 |
| 5,099,699 | A | * | 3/1992 | Kobold | 73/861.79 |
| 5,305,916 | A | | 4/1994 | Suzuki et al. | |
| 5,325,715 | A | * | 7/1994 | Foran et al. | 73/261 |
| 5,388,466 | A | * | 2/1995 | Teunissen | 73/861.33 |
| 5,704,767 | A | * | 1/1998 | Johnson | 417/43 |
| 5,747,703 | A | * | 5/1998 | Plisson et al. | 73/861.77 |
| 5,816,246 | A | * | 10/1998 | Mirza | 600/539 |
| 5,895,847 | A | * | 4/1999 | Steuer | 73/261 |
| 5,902,938 | A | * | 5/1999 | Beaudoin et al. | 73/861.77 |

(Continued)

FOREIGN PATENT DOCUMENTS

EP 0722044 7/1996

(Continued)

OTHER PUBLICATIONS

PCT/IB2010/050633, International Search Report and Written Opinion dated Sep. 27, 2010, 10 pages.

*Primary Examiner* — Harshad Patel
(74) *Attorney, Agent, or Firm* — Fredrikson & Byron, P.A.

(57) ABSTRACT

Embodiments of the invention provide devices and methods for measuring fluid volume. Devices according to some embodiments include a chamber, having a pair of gears rotatably mounted therewithin. Fluid flow through the chamber causes rotation of the gears, such that each rotation and/or partial rotation results in a known volume of the fluid passing through the chamber. An optical sensor positioned outside of the chamber, can view the rotating gears through a substantially transparent chamber wall. The optical sensor can view an optical characteristic of one or both of the gears, and based upon this data, fluid volume, flow rate, and/or flow direction can be determined. Devices and methods disclosed herein can provide for improved precision in fluid flow meter measurement. In addition, the devices and methods used herein can be more durable and easier to fabricate than previously known positive displacement flow meters.

27 Claims, 6 Drawing Sheets

U.S. PATENT DOCUMENTS

| | | | |
|---|---|---|---|
| 5,992,230 A | 11/1999 | Scarpa et al. | |
| 6,250,151 B1 | 6/2001 | Tingleff et al. | |
| 6,314,822 B1 * | 11/2001 | Ford | 73/861.77 |
| 6,617,079 B1 | 9/2003 | Pillion et al. | |
| 6,631,829 B1 | 10/2003 | Wagner et al. | |
| 7,360,454 B2 * | 4/2008 | Kawashima et al. | 73/861.57 |
| 7,374,066 B2 | 5/2008 | Jackson et al. | |
| 7,472,586 B2 * | 1/2009 | Niimi et al. | 73/114.42 |
| 7,523,660 B2 * | 4/2009 | Albrecht et al. | 73/261 |
| 7,851,775 B2 * | 12/2010 | Hoyt et al. | 250/577 |
| 2005/0127313 A1 | 6/2005 | Watson | |
| 2006/0101922 A1 * | 5/2006 | Niimi et al. | 73/861.57 |
| 2008/0202255 A1 * | 8/2008 | Albrecht et al. | 73/861.08 |
| 2008/0243057 A1 * | 10/2008 | Jacobson et al. | 604/67 |
| 2008/0243058 A1 * | 10/2008 | Jacobson et al. | 604/67 |

FOREIGN PATENT DOCUMENTS

| | | |
|---|---|---|
| EP | 1079207 | 2/2001 |
| JP | 2003344137 A | 12/2003 |
| JP | 2003344137 A * | 12/2003 |
| WO | WO 2006131134 A1 * | 12/2006 |
| WO | 2007132062 | 11/2007 |

\* cited by examiner

GEAR FLOW METER WITH OPTICAL SENSOR

TECHNICAL FIELD

The invention relates to a positive displacement fluid flow meter. More specifically, the invention relates to a gear flow meter incorporating an optical sensor and methods of use of such devices.

BACKGROUND

Positive displacement fluid measurement systems can be used to measure a fluid flow rate or volume. For example, dispensing systems can use feedback from a positive displacement fluid meter to control the volume of fluid dispensed. Such control systems can be used in lieu of time-on controls to more accurately dispense precise amounts of fluid.

One type of positive displacement fluid measurement system is a gear flow meter, e.g. an oval gear or lobe meter. A traditional oval gear meter provides a pair of oval gears positioned within an oval gear chamber such that the gears rotate in concert. A lobe meter, provides a pair of lobe elements within a chamber which interlock and rotate about respective axes. In each case, fluid enters the chamber through a fluid inlet and causes the gears to rotate, allowing fluid to pass around the gears to a fluid outlet within precisely measured pockets. In an oval gear meter, the pockets are defined between the rotating oval gears and the inner chamber wall. In a lobe meter, spaces between the lobes of provide the pockets. Ideally, in each case, none of the fluid being metered passes directly between the gears themselves, so that the volume of fluid exiting the chamber during each rotation is known. Thus the volume of fluid flow through a gear meter can be measured by measuring the number of rotations of the gears. Likewise flow rate can be determined from the speed with which the gears rotate.

For measuring the gear rotation, gear meters frequently include additional gears. For example, an oval gear meters can include timing gear systems located external of the chamber to translate the number of rotations of the oval gears into an appropriate signal. Oval gear and other positive displacement flow meters utilizing timing gear systems have the disadvantage that the cover of the gear chamber must include one or more shaft apertures for the shafts coupling the gears to the external timing gears. Fluid leakage can occur through these shaft apertures which can decrease precision of the measurement and waste fluid product.

Commonly owned U.S. Patent Application Publication No. 2008/0202255 A1 describes an oval gear meter incorporating a magnetic sensor for measuring the rotation of the oval gears with reference to a permanent magnet installed within at least one of the oval gears. Such a system addresses the issue of openings or apertures within the oval gear chamber by providing a magnetic detection of rotation through a substantially sealed chamber. However, it is often the case that the magnets must be sealed from the fluid, for example, when the meter is used with aggressive liquids. Complicated mechanics are required to seal the magnets within the gears which render such gears expensive and difficult to implement on a small scale.

Moreover, as the meter resolution is increased, the strength, size, and use of magnetic gear meters become limited. For very small meter resolutions (e.g. less than 0.5 ml), the use of magnetic gear meters can be precluded due to magnetic field interference, magnet size, and sensor location.

SUMMARY

Embodiments of the invention provide devices and methods for measuring fluid volume. Devices according to some embodiments include a chamber, having a pair of gears rotatably mounted therewithin. Fluid flow through the chamber causes rotation of the gears, such that each rotation and/or partial rotation results in a known volume of the fluid passing through the chamber. An optical sensor positioned outside of the chamber, can view the rotating gears through a substantially transparent chamber wall. The optical sensor can view an optical characteristic of one or both of the gears, and based upon this data, fluid volume, flow rate, and/or flow direction can be determined.

In a first aspect, the invention features a flow meter for measuring fluid volume and or flow rate. The device includes a housing which defines a chamber having a fluid inlet and a fluid outlet. In addition, the housing includes a substantially transparent wall. A pair of gears are installed within the chamber, such that the gears can rotate in response to fluid flow through the chamber. In some embodiments, the gears may be oval gears. One or more of the gears may have a distinctive optical characteristic on a surface that is viewable through the substantially transparent wall. The device further includes an optical sensor located outside of the chamber and configured to detect the distinctive optical characteristic through the substantially transparent wall.

In another aspect, the invention features a method for measuring a volume of a fluid. The method can include providing a chamber having a fluid inlet, a fluid outlet, a pair of gears, and a substantially transparent wall. The fluid inlet can be in fluid communication with a fluid source. An optical sensor may be provided outside of the chamber. Fluid may be dispensed through the chamber causing the gears to rotate as the fluid passes through the chamber from fluid inlet to fluid outlet. The rotation of the gears may be viewed with the optical sensor through the substantially transparent wall of the chamber. Rotations made by the gears may be counted with the optical sensor. The volume of fluid can then be calculated based upon the number of rotations made by the gears and the known chamber volume representing the volume of fluid dispensed through the chamber per rotation.

In some embodiments, the devices and methods disclosed herein may provide for the accurate determination of fluid flow volume, rate, and/or direction. The devices and methods disclosed herein may further allow for such determination at a improved level of precision over mechanical or magnetic measurement methods. Moreover, embodiments can include a sealed chamber, such that substantially no fluid leaks or escapes the fluid flow path of device. Moreover, some embodiments operate with fewer moving parts that other such measurement devices, thus decreasing the likelihood of mechanical breakdown. In addition, gears used with embodiments and methods disclosed herein can be easier to fabricate than gears used in previous devices.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodi

DETAILED DESCRIPTION OF ILLUSTRATIVE EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

The term "fluid" is used herein to identify any continuous substance that is tending to flow or conform to the outline of its container. So the term fluid encompasses liquids and gasses. A particularly interesting application of the present invention is for liquids, in particular liquid products and chemicals used in cleaning, washing, disinfecting, rinsing, or the like.

Figure 1:
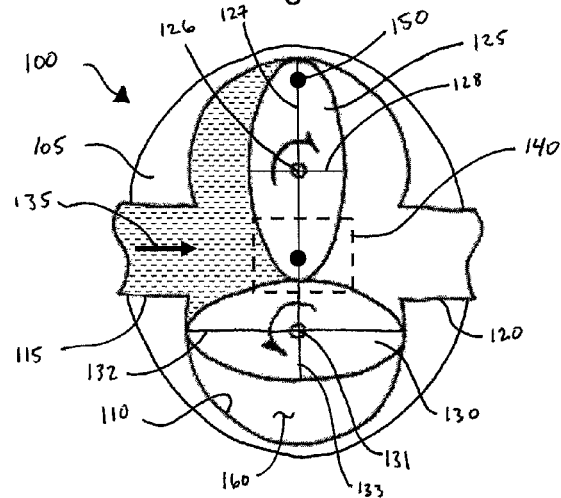
- FIG. 1 is a top plan view of an oval gear flow meter according to some embodiments.
Figure 2:
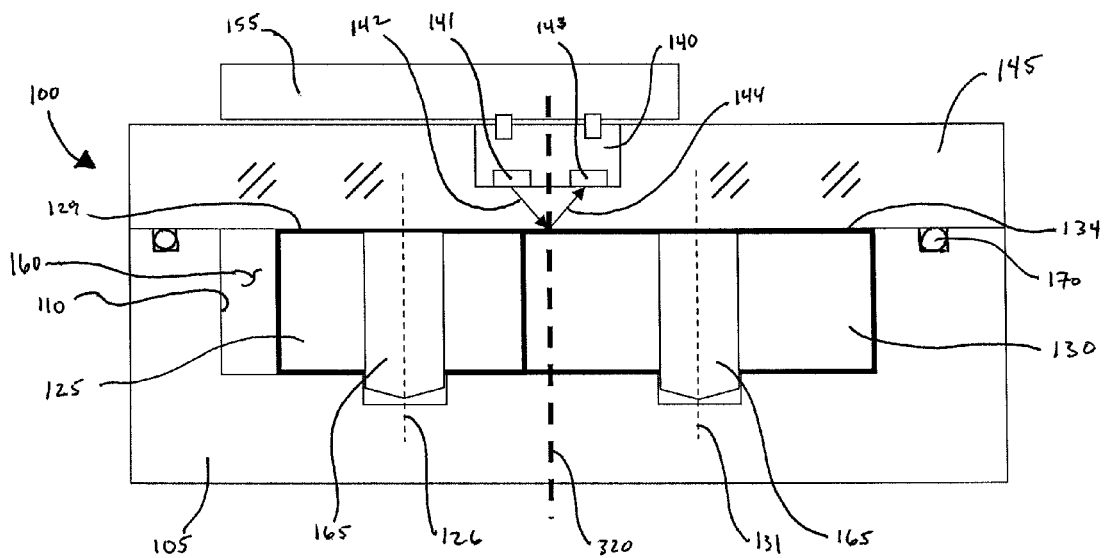
FIG. 2 is a side sectional view of an oval gear flow meter according to some embodiments.

FIGS. 1 and 2, show views of an oval gear flow meter 100 according to some embodiments. Embodiments include a housing 105 defining a chamber 110 having fluid inlet 115 and fluid outlet 120. A pair of oval gears 125, 130 are installed within the chamber such that they are rotatable about fixed axes of rotation 126, 131 in response to fluid flow 135 along a positive displacement fluid path from the fluid inlet 115 to the fluid outlet 120. An optical sensor 140 is positioned outside of the chamber 110 and configured to view into the chamber 110 through a substantially transparent wall 145 of the housing 105. As the oval gears 125, 130 rotate within the chamber 110, the optical sensor 140 detects the alternating presence and absence of a distinctive optical characteristic 150 of one or both of the gears. In some embodiments, the oval gear meter includes evaluation electronics 155 for counting the number and degree of rotations of the gears and determining the volume of fluid passing through the sensor based upon this figure. In this manner, a fluid volume and flow rate through the meter can be determined at a high resolution while maintaining a sealed chamber.

With reference to FIG. 1, the general principle of oval gear meter for volume flow measurements is described. As the gears 125, 130 turn, they sweep out and trap a precise volume, or pocket, of the fluid 160 against an inner wall of the chamber. Because the chamber wall coincides with the arc of the major vertex 127, 132 of the gears throughout their rotation, this pocket of fluid gets trapped between the chamber wall and the surface of the gear along the gear's minor axis 128, 133 and swept from the fluid inlet 115 to the fluid outlet 120. Moreover, because the oval gears 125, 130 are in contact throughout their entire rotation, no fluid passes between the gears. Thus, by this action, the volume of fluid flowing through fluid outlet is metered according to the known pocket volume. Total volume and flow rate can then be measured based upon the number of times the pockets are filled and emptied (i.e. based upon the number of rotations of the gears).

Embodiments according to the present invention utilize the general principles of operation of oval gear and other positive displacement flow meters in conjunction with novel optical counting devices and methods. Thus, some components of the present invention correspond to components present in traditional oval gear or other flow meters. Accordingly, one of ordinary skill in the art will recognize that various improvements and alterations to such common components may be applicable to, and should be considered within the scope of, embodiments of the present invention.

Referring now to FIG. 2, an oval gear flow meter 100 comprises a housing 105 to receive the components of the meter. The housing 105 defines a chamber 110 within which the oval gears 125, 130 reside. In some embodiments, the housing is adapted to receive axles 165 which provide for positioning and allow for the rotation of the oval gears within the chamber 110. Housing 105 can comprise any material compatible with the fluid being metered. In some embodiments, the housing comprises a molded plastic.

As described above, the oval gear meter measures fluid volume and flow rate based upon the known pocket volume of the chamber and the number and degree of rotation of the gears. Accordingly, the resolution of the oval gear meter depends largely upon the size of the chamber 110 and specifically, the size of the pocket 160 created between the minor vertex 128, 133 and the inner chamber wall. The pocket size 160 can vary widely based upon the application. In some embodiments, the pocket is sized such that the flow meter has a resolution of less than approximately 0.5 ml. Some embodiments can include improved resolution (i.e. smaller pocket size) including resolution of less than approximately 0.2 ml or approximately 0.05 ml or below. Advantageously, embodiments according to the present invention are generally not limited in resolution due to the fabrication or practical considerations involved with magnetic oval gear sensors described above.

The housing 105 further includes a substantially transparent wall 145 for providing a view into the chamber 110. More specifically, substantially transparent wall 145 should be oriented to provide a view of the rotating oval gears within the chamber 110. In particular, where the oval gears include a distinguishing optical characteristic, that characteristic should be viewable through the transparent wall. For example, in some embodiments, the top surface 129, 134 of one or more of the oval gears 125, 130 includes a distinguishing optical characteristic. In such case, the substantially transparent wall 145 can be located adjacent to the top surface 129, 130 and perpendicular to the first and second axes of rotation 126, 131. As used herein, the terms "transparent wall" and "substantially transparent" wall should be understood to mean a wall capable of transmitting at least a portion of light energy in the wavelength(s) in which the sensor operates. Thus, a transparent wall, need not necessarily be transparent to visible light. Moreover, the transparent wall 145 need not be entirely transparent. Rather, in some embodiments, the transparent wall is opaque but includes a transparent portion or window about which a sensor can be installed.

In general, embodiments of the present invention can be used with an oval gear or other flow meter that includes external timing gears, such as those known in the art. However, it is preferred and provides particular advantages that embodiments be used with a sealed gear chamber, i.e. apart from the fluid inlet and fluid outlet, there are no openings into the chamber. To facilitate this, the transparent wall 145 should form an appropriate seal with the housing 105. In some embodiments, the transparent wall is permanently affixed to the housing. Alternatively, in some embodiments, the transparent wall comprises a removable wall that is attached by screws or other means to the housing and includes a sealing means (e.g. a resilient o-ring 170) to maintain the seal of the chamber. The transparent wall 145 can comprise the same material as the housing or a different material. In some embodiments, the transparent wall comprises a polycarbonate material approximately 6 mm thick. In any case, the material of the transparent wall should be transparent or translucent with respect to at least the wavelength of light energy in which the sensor operates.

While embodiments described herein are generally discussed solely with regard to systems including a sealed chamber, one should appreciate that an optical sensor can be incorporated into gear flow meters having non-sealed chambers without deviating from the spirit of the invention. For example, the optical counting devices and methods disclosed herein can be used in addition to a traditional external timing gear or magnetic gear system.

Moreover, although the specific embodiments described herein are discussed primarily with regard to flow meters incorporating oval-shaped gears, the invention is not limited to such embodiments. One of ordinary skill in the art can appreciate that this invention can be practiced with a variety of positive displacement based flow meters. Embodiments of the invention are readily adaptable by one of ordinary skill to any positive displacement flow meter which operates by the delivery of discrete pockets of fluid per rotation of a flow meter element. For example, a lobe meter, which is a positive displacement flow meter which uses interlocking, lobe-shaped gear meter elements to pass fixed volume pockets of fluid through a chamber, can be adapted according to embodiments of the invention. Thus, the term "oval gear" as used herein should be broadly construed to incorporate other, non-oval shaped rotatable elements, such as the lobe meters described above.

Figure 3A:
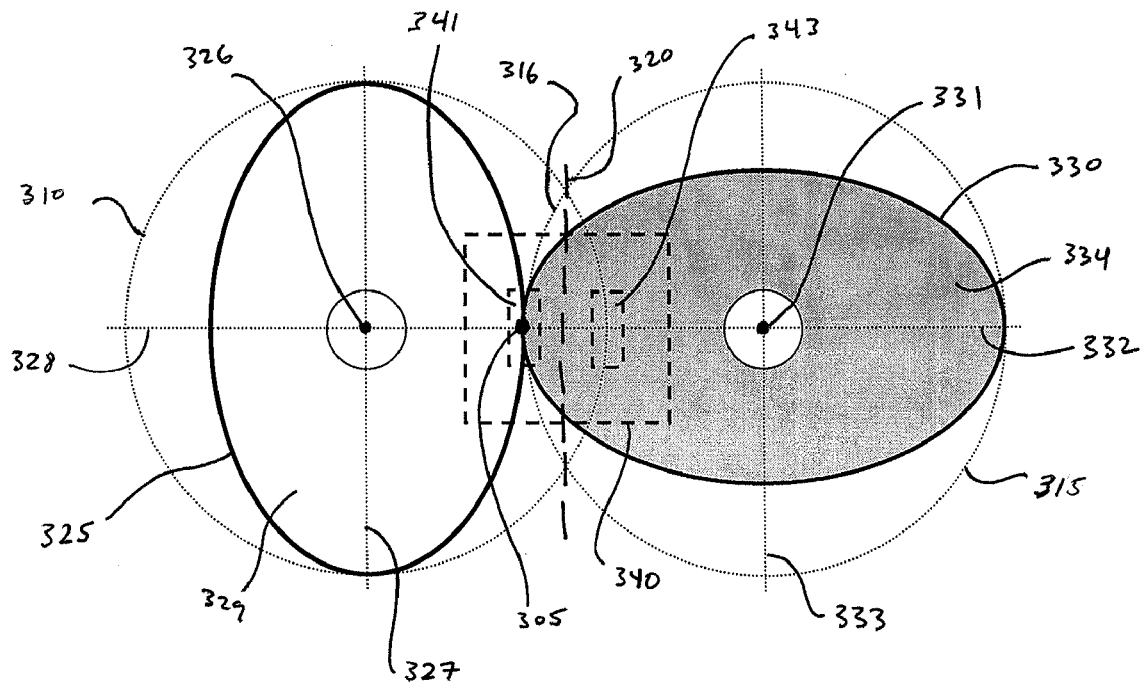
FIG. 3A is a schematic view of an oval gear flow meter including gears having different reflectances according to some embodiments.

FIG. 3A shows a pair of gears 325, 330 according to some embodiments. The gears are oval-shaped and configured to rotate about an axis of rotation 326, 330 located at the intersection of each gear's major axis 327, 332 and minor axis 328, 333. When installed in the chamber, the gears abut at a junction 305 such that when one gear's (here, the first oval gear's 325) minor vertex is at the junction 305 it abuts the other gear's (second gear's 330) major vertex, and vice versa. At all intermediate rotational points the oval gears 325, 330 remain in contact or substantially close so that no fluid can pass between the gears. The rotational arc of the major vertices of the gears 310, 315 should generally coincide with the dimension of the chamber so that the gears can trap and sweep the fluid from fluid inlet to fluid outlet as described above.

In addition, in some embodiments, the oval gears can include features to facilitate appropriate fluid flow. The gears shown in FIG. 3A have a smooth surface and operate run with a small, tolerance-defined gap at the junction 305. In such embodiments, surface tension of the fluid itself can prevent leakage of fluid through the junction. In other embodiments, the gears can be intermeshing gears. Intermeshing gears include a plurality of teeth along their surface which communicate at the junction of the gears such that the teeth of one gear fit within spaces between the teeth of the other gear. This communication is continuous throughout the rotation of the gears to thereby provide a more robust connection between the gears and prevent slippage of the gears at the junction. The selection of gear designs can depend upon the properties of the fluid being metered. For example, a high viscosity fluid is less likely to cause slippage between traction gears, so smooth gears may be appropriate. In contrast, low viscosity and/or high lubricity fluids may require the use of intermeshing gears.

Each oval gear 325, 330 generally comprises a rigid material such as plastic or metal. Because the gears come into contact with the metered fluid, the choice of gear material can depend upon the fluid being metered. One possible consideration can include the durability of the gear material with respect to corrosive fluids. For example, with high concentration detergents, sanitizers, or rinse aids the gears can comprise molded or machined plastic such as Poly-Ether-Ether-Ketone (PEEK) about a ceramic axle. Other potential gear materials include crystallized plastics such as ULTEM, which has a high durability, high temperature tolerance, low thermal expansion, low moisture absorption, and is chemically inert. Additional materials can include RYTON and metals such as 316 SS.

Moreover, according to embodiments of the invention, one or more of the gears 325, 330 includes a distinctive optical characteristic viewable by the sensor through the transparent wall. In some embodiments, the distinctive optical characteristic is located on the top surface 329, 334 of the gears, adjacent to the substantially transparent wall. The distinctive optical characteristic can be any indication which results in the optical sensor 340 registering a reading different from when the characteristic is not in view. For example, in the embodiment of FIG. 3A, the top surface of each of the gears 329, 334 has a different optical reflectance at the wavelength in which the sensor 340 operates. In particular, the top surface of the first oval gear 329 is a first color (here, white) and the top surface of the second oval gear 334 is a second color (here, black). Thus, the distinctive optical characteristic is that the oval gears can be distinguished from one another. Of course, many different color combinations can be selected, so long as the sensor is able to differentiate when each of the colors is located below the sensor. Moreover, the distinctive characteristic should not be limited to different color combinations, for example, different materials which have different reflectances could be used such as a highly reflective material (e.g. a mirror) and an opaque or dull material. Also, the distinctive optical characteristic can be applied by any means, including painting, attachment of a separate element, installation of a colored insert, or forming the gear of a different material.

Figure 3B:
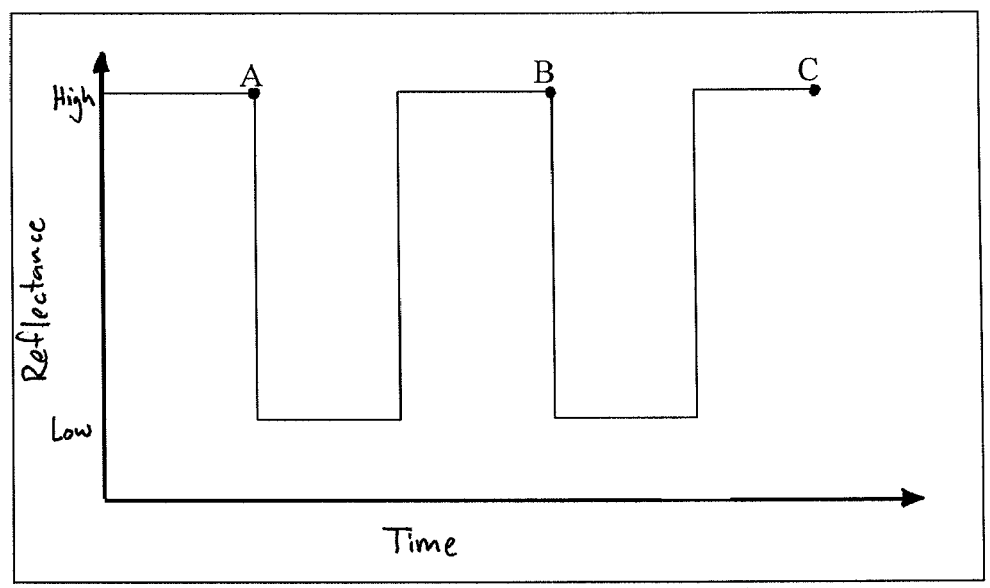
FIG. 3B is a plot of Reflectance v. Time representative of optical sensor readings according to some embodiments which include distinctive optical characteristics such as that of FIG. 3A.

FIG. 3B shows an exemplary plot of the reflectance v. time curve for an oval gear meter including two gears rotating at a constant rate and having a distinctive optical characteristic such as that of FIG. 3A. Here the "high" reflectance periods reflect the time during which the first (white) gear 325 is within view of the sensor 340. The "low" reflectance periods correlate with the time periods during which the second (black) gear 330 is within view of the sensor 340. When one considers that during one full rotation, each gear will be visible to the sensor twice, the number of rotations can easily be determined. In such case, the optical sensor and evaluation electronics should be configured to count based on transitions from white to black (or black to white) to get two transitions per full rotation, or from white to black and black to white to get four transitions per full rotation. Alternatively the evaluation electronics can be configured to count based upon the number of periods of high and/or low reflectance (e.g. two high and low periods per full rotation). For example, in FIG. 3B, the time from Point A to Point C represents one full rotation, resulting in four discrete volumes (pockets) of fluid being passed out of the meter. Point A to Point B represents one half rotation, resulting in two discrete volumes (pockets) of fluid being dispensed.

Figure 4A:
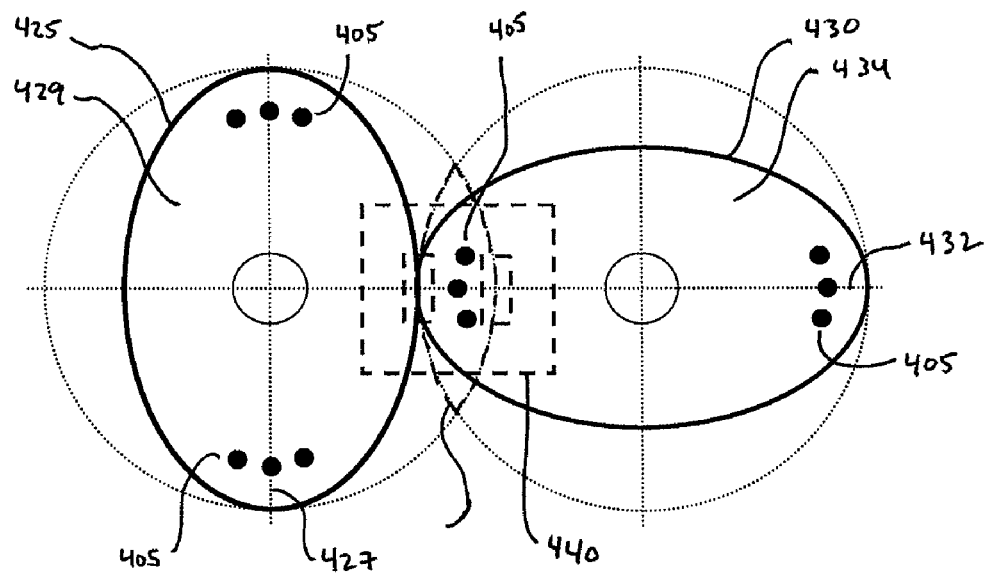
FIG. 4A is a schematic view of an oval gear flow meter including distinctive markings according to some embodiments.

In other embodiments, such as that of FIG. 4A, the top of each of the oval gears 425, 430 is distinctive in and of itself. That is, the top surface of each of the oval gears 429, 434 includes one or more markings, in this case discrete dots 405, about the major axes 427, 432 of the gears which provide an optical characteristic distinctive relative to the remainder of the surface of the gear. Particularly, here the dots 405 which are black, are set off against a white top surface 429, 434. In such embodiments, the first and second gear 425, 430 are not necessarily distinguishable from one another (although they could be made to be so), but number of rotations can be discerned from the number of markings sensed by the sensor 440. For each full rotation, each of the dots 405 of the first gear 425 pass under the sensor 440 one time. In addition, each of the dots 405 of the second gear 430 pass under the sensor 440. Thus, by this configuration, for each full rotation the sensor registers twelve distinct regions of reflectance (i.e. lower reflectance in this case). Of course, the invention is not limited to embodiments using discrete dots as the distinctive characteristic. For example, each marking could comprise a hole through the device, a mirror or other reflective item inset into the surface, or other patterns printed, etched, painted, or molded onto the surface. Moreover, the distinctive marking need not be discrete. For example, a continuous color gradient could be fixed to the gear such that gear position can be determined based upon the color value currently viewed.

Figure 4B:
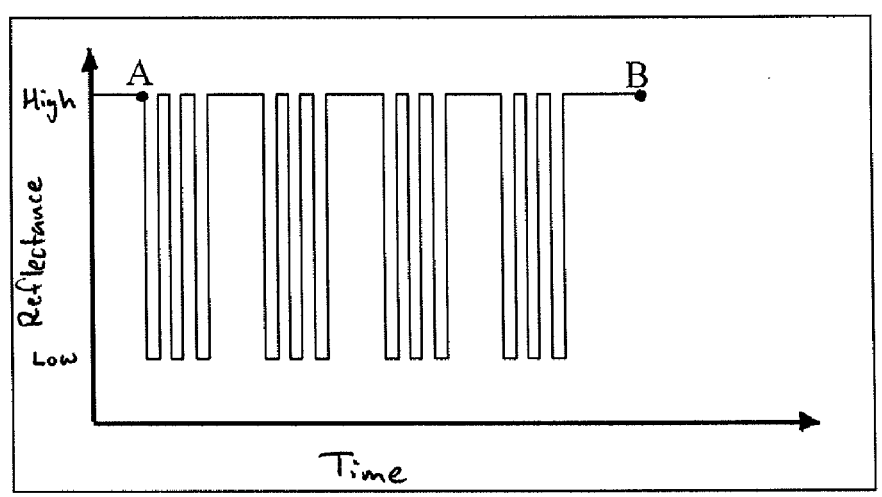
FIG. 4B is a plot of Reflectance v. Time representative of optical sensor readings according to some embodiments which include distinctive optical characteristics such as that of FIG. 4A.

FIG. 4B is a plot exemplary of sensor output for an arrangement such as that of FIG. 4A when the gears are rotating at a substantially constant rate. Here, between Point A and Point B (one full rotation), the twelve discrete valleys correspond to the twelve time periods during which the markings pass under the sensor 440. These valleys correspond to twelve distinct gear positions, thus allowing for greater resolution in the determination of the volume of fluid which has passed through the meter. In this case, the resolution of the device can be as low as one third of the volume of one pocket. Of course, embodiments can include more or fewer markings with a corresponding effect on the device resolution. For example, an oval gear meter can include a single discrete marking on one of the gears allowing for the resolution of the device to the volume dispensed in one rotation (or four pockets because each rotation results in four pockets being dispensed).

Referring back to FIG. 2, embodiments further include an optical sensor 140. The optical sensor can be any sensor capable of detecting the optical property of the gears used to determine the gears rotational position. Sensors adapted to measure generally any optical property can be used including, for example, reflectance or transmittance. In some preferred embodiments, the optical property is reflectance. Reflectance can be measured by a sensor 140 including an emitter 141, which emits light energy 142 of one or a range wavelengths and a detector 143 which is positioned to receive reflected light 144 of all or a portion of the range of emitted wavelengths. The light energy can be electromagnetic radiation of generally any wavelength, for example, UV, visible, infrared and other light can be used. In some preferred embodiments infrared light can be used. For example, in some embodiments, reflectance is measured with a 940 nm QRB1114 or 950 nm EE-SY125 reflective sensor. Such sensors may be selected because they are readily available, for example from DigiKey, Corp. at http://www.digikey.com/. In principal, higher sensor resolution can be achieved with shorter wavelength and more focused light energy. Using an ultraviolet (UV) emitter and/or laser, can provide such improved resolution. However, it should be remembered that the transparent wall of the chamber should be substantially transparent to the corresponding radiation. For example, where the sensor operates within the UV spectrum, quartz, TPX, or sapphire are preferable transparent wall materials as compared with polycarbonate material.

In one example (e.g. FIG. 6), a 940 nm QRB1114 reflective sensor was used to measure reflectance of the surface of two gears. One of the gears was painted black, the other white. The gears were viewed through a transparent polycarbonate wall (n=1.58) having a thickness of 6 mm. The resulting sensor response between the black and white gears differed by a factor of 10, i.e. voltage reading across sensor when viewing the black gear was approximately 10 times the voltage reading of the white gear.

In another example (e.g. FIG. 7), a 950 nm EE-SY125 reflective sensor was used with a 3 mm polycarbonate transparent wall. Each of the gears was an oval gear molded using black plastic and contained round, white inserts on both sides of the major axis of the gear. The shape of the output signal on the detector of phototransistor was close to sinusoidal with peak-to-peak amplitude of approximately 1.0 V. In such case, operational amplifier used as a limiting amplifier or Schmitt trigger can be used to provide rectangular output pulses.

Referring back to FIG. 2, some embodiments further include an optical element positioned between the sensor 140 and the gears. The optical element can be a separate element installed within the transparent wall 145 or may be a component constructed out of the transparent wall. Optical elements can include, for example, lenses and filters which can be constructed to optimize and condition the signal propagation through the substantially transparent wall.

As described above, optical sensor 140 should be positioned such that one or more of the rotating gears can be viewed. With regard to the transparent wall, the sensor should be installed adjacent to the transparent wall such that it can view through the wall. For example, in some embodiments, a sensor can be abutted against an exterior surface of the wall. Alternatively, as in FIG. 2, the sensor 140 can be embedded within the transparent wall 145. In either case, the sensor should be positioned such that the path length of the emitted and reflected light energy are optimized according to the particular sensor used. For example, sensors can have an optimal distance from the target of 0.150 inches (3.81 mm) in air for a QRB1114 or 0.040 inches (1.02 mm) in air for an EE-SY125. Such devices should be installed such that the distance from the top surface 129, 134 to the sensor is approximately the optimal distance taking into account an adjustment factor of the transparent wall material, such as, e.g. the refractive index of the transparent wall material.

Moreover, the optical sensor should be positioned within the circle defined by the path of rotation of the major vertex of each gear so as to appropriately view the oval gears. As seen in FIG. 3A, the rotation of the major vertex dimension of the oval gears results in circles 310, 315 that overlap yielding an region 316 where both gears can be viewed. A portion of each of the oval gears pass through this region 316 twice during each rotation. Embodiments in which the sensor 340 is positioned such that the viewing line 320 is within this region 316 can utilize counting algorithms based upon transitions between the gears or on markings of one or both gears. In some embodiments, the sensor 340 is positioned to view a location within the region of overlap on a line defined by the first and second axis of rotation 326, 331 (here, corresponding to the line formed along the minor vertex of the first gear 327, and the major vertex of the second gear 332) and approximately half way between said axes of rotation 326, 331. In such a location, under a constant rotational speed, the duration for which each gear is viewed is approximately equal. Moreover, this location may be advantageous because the optical sensor views the surface of the oval gears, and not a location where fluid passing through the meter presents. Accordingly, embodiments do not need to account for variations in observed reflectance values due to viewing of only the fluid.

Alternatively, the sensor can be positioned elsewhere relative to the gears, so long as at least one gear is viewable. However, when the sensor is not positioned such that only one gear is viewable, i.e. not within the region of intersection, the gears should include appropriately positioned markings or the like. That is, the gear should include one or more markings that pass within the viewing location.

Some embodiments can include more than one optical sensor. In such embodiments, each sensor can be positioned so as to be capable of viewing both gears, each sensor can be positioned so as to view only one of the gears, or some combination of one and both gears. In any case, embodiments including multiple sensors can be especially useful for determining the direction of rotation of the gears within the flow meter. For example, a pair of optical sensors can be positioned side by side within the region of intersection such that one sensor registers a marking or transition before the other. Depending upon which of the sensors first registered the marking or transition, the direction of rotation can be determined. Alternatively, the direction of rotation can be determined based upon the phase difference between output signals of the two optical sensors. Additionally, embodiments can include multiple sensors as a redundancy measure for ensuring an accurate count.

In addition, flow meters according to some embodiments, can be configured such that the direction of rotation (i.e. the direction of fluid flow) can be determined. One such example of an embodiment capable of determining the direction of flow has been discussed above with regard to embodiments including multiple sensors. In another example, such as that depicted in FIGS. 5A-5C, each gear includes a predetermined number of discrete dots on its top surface. In this example, the first gear 525 includes a single dot 570 along the major axis 527 at one end, and two dot set 571 about the major axis 527 on the opposite end. In contrast, the second gear 530, includes a three dot set 572 about the major axis 532 on one end, and a single dot 573 along the major axis 532 at the opposite end.

Figure 5A:
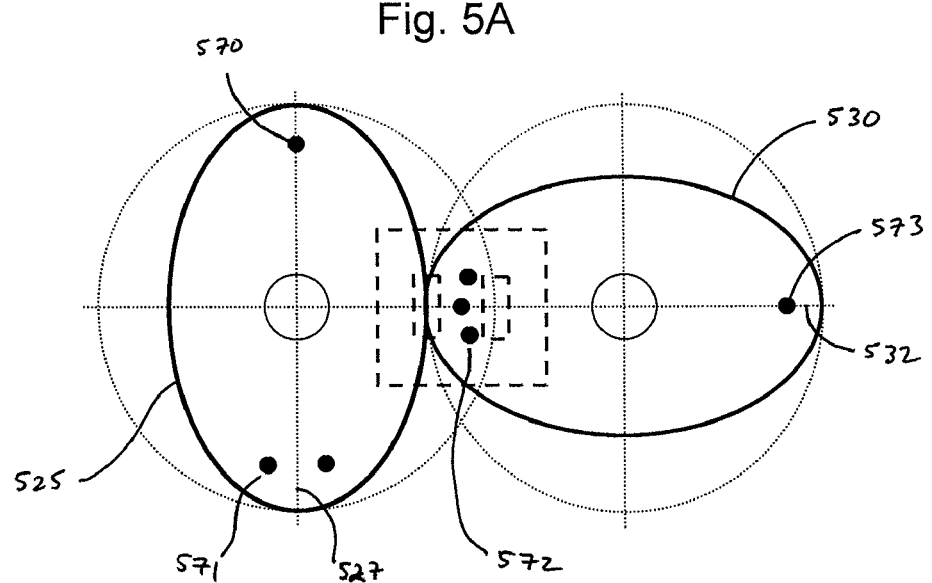
FIG. 5A is a schematic view of an oval gear flow meter including distinctive markings indicative of direction of rotation according to some embodiments.
Figure 5B:
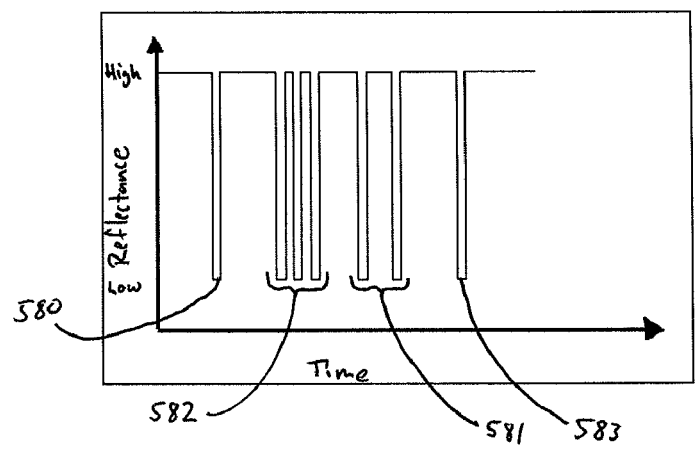
FIG. 5B is a plot of Reflectance v. Time representative of optical sensor readings according to some embodiments which include distinctive optical characteristics such as that of FIG. 5A rotating in first direction.
Figure 5C:
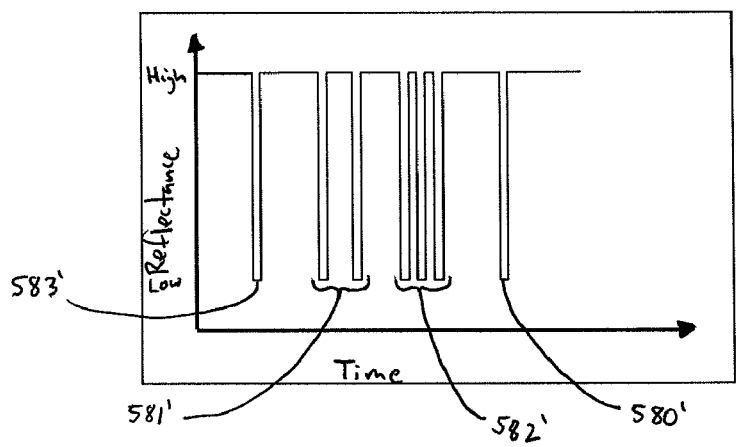
FIG. 5C is a plot of Reflectance v. Time representative of optical sensor readings according to some embodiments which include distinctive optical characteristics such as that of FIG. 5A rotating in a second direction.

In operation, the device of FIG. 5A will produce different sensor output depending upon the direction of rotation. FIG. 5B is an exemplary plot of the sensor output of the flow meter when flow is progressing in a first direction. Here, isolated peaks 580, 583 indicate the periods during which the single dots 570, 573 are positioned within view of the optical sensor. Triple peak 582 and double peak 581 indicate the periods during which the side of the second gear 530 bearing three dot set 572 and the side of the first gear 525 bearing two dot set 571, respectively, are located within view of the optical sensor. Because triple peak 582 occurs before double peak 582, the system can determine that the flow meter is operating such that the first gear 525 is rotating counter-clockwise and the second gear 530 is rotating clockwise. Conversely, in FIG. 5C, double peak 581' occurs prior to triple peak 582', indicating that the first gear 525 is rotating clockwise and the second gear 530 is rotating counter-clockwise.

In yet another example, two markings can be located side by side on the top surface of a single oval gear, each marking having a distinctive optical property relative to the other marking. Direction of rotation can be determined by evaluating which of the distinctive markings is shown first relative to the other. Of course one of skill in the art can appreciate many other ways of determining directionality based upon optical readings of distinctive markings, all of which should be considered within the scope of this invention.

As described above, the measurement of the volume of fluid and/or fluid flow rate can be determined based upon the number of rotations of the oval gears and the known volume of fluid dispensed per rotation. Many embodiments, such as those of FIG. 2 include evaluation electronics 155 for carrying out these calculations. In some embodiments the optical sensor 140 can be installed on a printed circuit board including the evaluation electronics 155. In other embodiments, the evaluation electronics are more remotely located. Evaluation electronics 155 can include various components for providing for the operation of and interface with the optical sensor including read out circuitry, signal conditioning electronics, an analog to digital converter (ADC), memory, and/or a controller. In some embodiments, the evaluation electronics 155 further include a wired or wireless transmitter for transferring data to remote devices.

Figure 6:
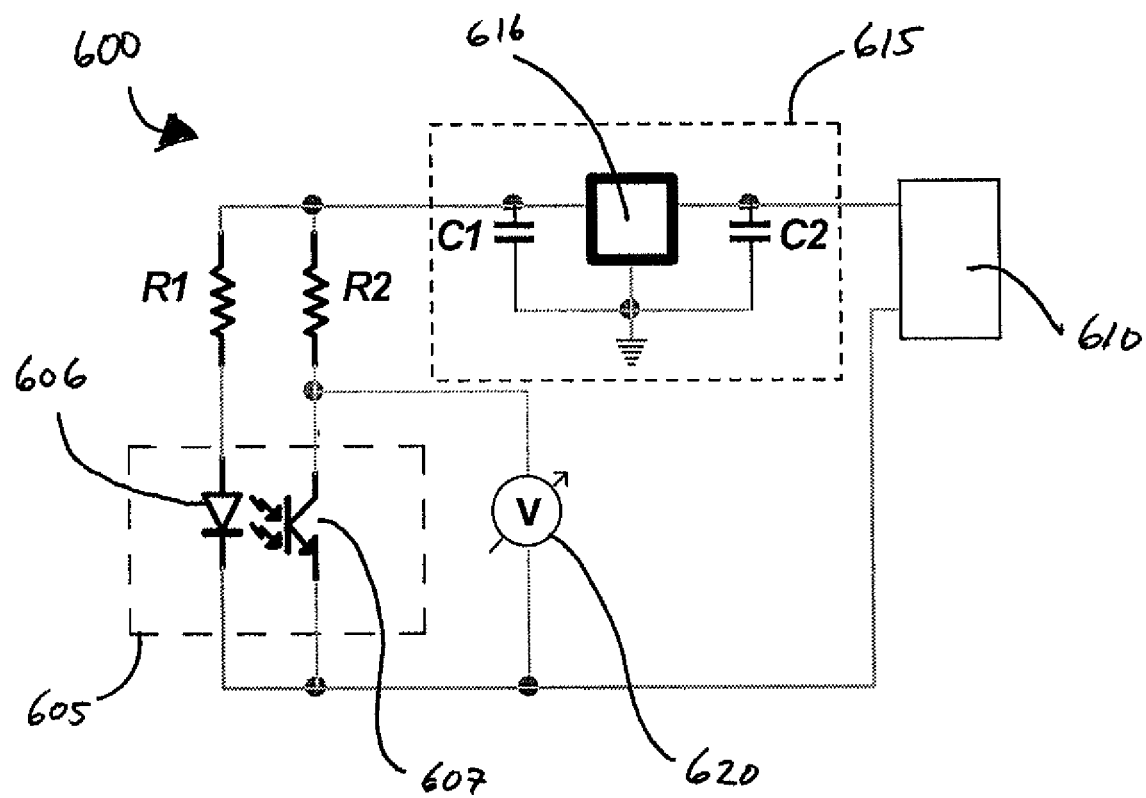
FIG. 6 is a schematic view of a read out circuit for a gear flow meter according to some embodiments.

FIG. 6 shows an exemplary read out circuit 600 according to some embodiments. The read out circuit 600 can be used to generate an output signal based upon the response of the optical sensor. Read out circuit 600 includes an optical sensor 605 connected with a power source 610 via regulator circuit 615, which provides for stable emitter intensity. The optical sensor 605 includes an emitter 606 and a detector 607. Voltage sensing circuitry 620 coupled across the detector 607 provides the output signal. In some embodiments the optical sensor 605 comprises a pre-packaged sensor element such as, for example, a 940 nm QRB1114 reflective sensor or a 950 nm EE-SY125 reflective sensor. Alternatively, the optical sensor 605 can comprise a separate emitter element, e.g. a light emitting diode (LED) or laser, and a separate detector element, e.g. a phototransistor or photodiode. Power supply 610 can comprise generally any source of DC power up to 30 V including a 9V or other battery or an AC power adapter. Regulator circuit 615 ensures that the power source provides appropriate power to the sensor 605, and can comprise a voltage regulator 616 (e.g. low dropout voltage regulator LM2950 or similar device) with a pair of shunt capacitors C1, C2. Some embodiments further include a pulse generator to power an LED emitter with short pulses to decrease sensor power consumption.

Figure 7:
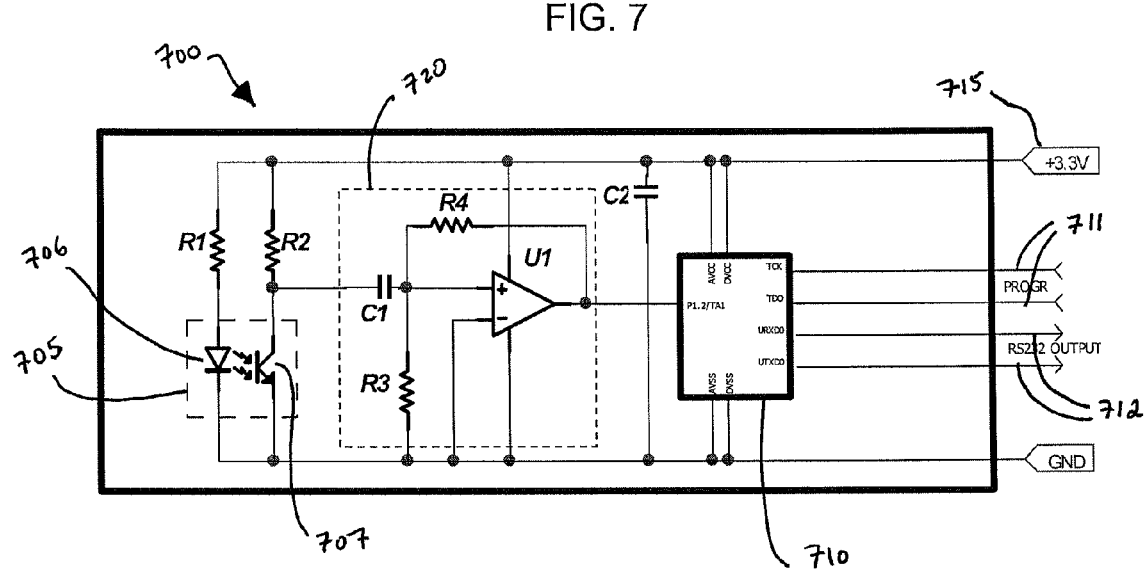
FIG. 7 is a schematic view of a read out circuit for a gear flow meter according to some embodiments.

FIG. 7 shows exemplary evaluation electronics 700 according to some embodiments. The evaluation electronics 700 include a sensor 705, having an emitter 706 and a detector 707. A controller 710, is powered by power supply 715 (e.g. a regulated 3.3 V power source) which also supplies power to the sensor 705. The controller 710 can comprise a low power controller such as a TI MSP430 microcontroller, for example. In this embodiment, voltage sensing circuitry 720 connected across the detector 707, comprises a Schmitt trigger. The Schmitt trigger provides square wave output (e.g. pulses) which can be received by the controller 710. Instructions pre-programmed within or written to the controller via input lines 711 can provide for the use of the controller 710 for converting quantity of pulses to volume of liquid and/or flow rate based upon the particular gear meter with which it is used. The controller 710 can also carry out instructions for determining flow direction. Controller output lines 712 can carry an output signal provided by the controller 710 which can be transmitted to other devices such as an output/display, a control mechanism, or a transmitter for communication with a remote device.

In operation, the evaluation electronics can collect an output signal from a readout circuit and generate a value indicative of the volume or rate of fluid flow through the oval gear flow meter. In particular, the output signal of the voltage sensing circuitry 620 generally resembles that of FIG. 3B, 4B, 5B, or 5C. This output can be processed by a controller or other processing circuitry to determine a count of the number of rotations of the oval gears. Depending upon the resolution of the oval gear flow meter, the count of the rotations can be a whole number, or a number indicative of partial rotations. Based upon the count of rotations, and the known chamber (or pocket) volume (i.e. the volume of fluid dispensed through the chamber per rotation) the controller can determine the volume of fluid dispensed through the oval gear flow meter. This volume can then be output to a display or memory, or used as feedback for control of a device or process.

The system can be particularly advantageous if combined with a corresponding fluid pump and/or a shut-off valve. The pump can employ electrically driven pump with an electronic control interface for communicating with the evaluation electronics, e.g. through a bus or other connection. In operation of such a device, the control interface of the fluid pump or shut-off valve receives from the oval gear meter or its evaluation electronics, output corresponding to the volume (or flow rate) dispensed through the flow meter. Upon reaching a predetermined value, the pump can be turned off or the shut-off valve closed resulting in only that predetermined volume of fluid being dispensed. Moreover, continuous fluid flow control can be achieved by adjusting the pump rate based upon feedback from the flow meter.

In some embodiments, the flow meter includes a programmable logic controller operating software which allows for additional functionality of the oval gear flow meter. For example, the device can include a calibration mode for on site calibration and fine tuning of the flow meter. Moreover, some embodiments can include the ability to manually input a specific volume or flow rate and cause that desired amount to be dispensed.

In another aspect, embodiments of the invention include methods for measuring the volume of a fluid. In such methods, a chamber having a substantially transparent wall and a pair of oval gears, such as those described above, is provided in fluid communication with a fluid source. An optical sensor is provided outside of the chamber. The fluid is dispensed through the chamber causing the oval gears to rotate. The optical sensor views the rotation of the oval gears through the substantially transparent wall. Then, as described above, the volume is calculated based upon a count of the number of rotations (full or partial) of the oval gears and the known chamber volume representing the volume of liquid dispensed through the chamber per rotation. Such methods can be carried out by the devices described above or by other means as will be apparent to one of ordinary skill in the art.

In particular, embodiments of methods of measuring the volume of a fluid can count the number of rotations made by the oval gears using a variety of methods. In one method, light energy is emitted through the substantially transparent wall such that it impinges upon a location within the chamber and reflects back through the substantially transparent wall. The location within the chamber can be selected to be one through which both oval gears pass during rotation. The amount of reflected light energy is determined such that light energy reflecting off of one of the gears can be distinguished from light energy reflecting off of the other gear. Transitions between the distinguishable periods of reflected light are then counted and the number of rotations (full or partial) can be calculated based upon the count of transitions. Alternatively, the step of counting the number of rotations can be accomplished by counting periods of distinct reflection from gears including distinctive optical portions. In such case, the gears can include one or more distinctive portions (e.g. the markings described above) which the optical sensor perceives as distinctive periods of a different reflection value. A count of these distinctive periods can be maintained, and based upon the known number and location of such markings, the number (and/or degree) of rotations can be calculated.

Embodiments of systems and methods in accordance with those described above can be used in a variety of applications and with a wide range of fluids. The oval gear flow meters described herein can enable systems utilizing fluids at elevated concentrations which must be precisely metered are enabled. For example, a particular application can include a fluid dispensing system for concentrated volumes of fluids for cleaning, washing, disinfecting, rinsing, or mixtures thereof. Moreover, embodiments are well suited for use with existing systems which require the dispensing of precise volumes of fluids. Additionally, embodiments can be used for metering water, lubricants, sanitizer or detergent. Some embodiments can be used with fluids having viscosities ranging from 1 centipoise to 1000 centipoise (or greater). In most cases, the transparency of the fluid being metered is irrelevant as the optical sensor, substantially transparent wall, and rotating gears are positioned so that any fluid within the path of the light energy is limited to a thin film. At substantially tight tolerances (e.g. 0.002 inches or less) a thin film of a seemingly opaque fluid, can be penetrated by enough light energy to appropriately count gear rotations.

Although the present invention has been described in considerable detail with reference to certain disclosed embodiments, the disclosed embodiments have been presented for purposes of illustration and not limitation and other embodiments of the invention are possible. One skilled in the art will appreciate that various additional changes, adaptations, and modifications that may be made without departing from the spirit of the invention and the scope of the appended claims.

What is claimed is:

1. A flow meter for measuring fluid volume comprising:
   a housing defining a chamber having a fluid inlet and a fluid outlet, the housing comprising a substantially transparent wall;
   first and second gears installed within the chamber, the first and second gears being rotatable about respective first and second axes of rotation in response to fluid flow through the chamber, wherein at least one of the first and second gears comprises a distinctive optical characteristic on a top surface adjacent to the substantially transparent wall; and an optical sensor located outside of the chamber and configured to detect an optical property of the top surface of the gears through the substantially transparent wall, wherein the first gear is configured to sweep out a first area of rotation, the second gear is configured to sweep out a second area of rotation, and the first area of rotation and the second area of rotation overlap in an intersection area, and wherein the optical sensor is positioned to detect the top surface of the gears within the intersection area without detecting only fluid during rotation of the gears.

2. The flow meter of claim 1, wherein the first and second gears comprise oval gears.

3. The flow meter of claim 2, wherein the optical sensor is positioned approximately halfway between the first and second axes of rotation along a line defined by the axes of rotation.

4. The flow meter of claim 1, wherein the first and second gears each comprise a distinctive optical characteristic, and the optical sensor is positioned to detect the distinctive optical characteristics of both of the gears.

5. The flow meter of claim 1, wherein the optical property comprises reflectance of light.

6. The flow meter of claim 1, wherein the optical sensor comprises an emitter and a detector adjacent the substantially transparent wall.

7. The flow meter of claim 1, wherein the substantially transparent wall is perpendicular to the first and second axes of rotation.

8. The flow meter of claim 1, wherein the first and second gears each comprise a distinctive optical characteristic, and the distinctive optical characteristic comprises the top surface of each gear having a different optical reflectance.

9. The flow meter of claim 8, wherein the top surface of each gear comprises a different color.

10. The flow meter of claim 9, wherein the top surface of the first gear is black and the top surface of the second gear is white.

11. The flow meter of claim 1, wherein the distinctive optical characteristic comprises one or more markings on the top surface of each gear, the markings having a first optical reflectance and the top surface having a second optical reflectance.

12. The flow meter of claim 1, wherein the distinctive optical characteristic comprises one or more holes extending through the top surface of each gear.

13. The flow meter of claim 1, further comprising evaluation electronics for evaluating output signals of the optical sensor.

14. The flow meter of claim 1, wherein the flow meter has a resolution of less than 0.5 milliliters (ml).

15. The flow meter of claim 14, wherein the flow meter has a resolution of less than 0.2 ml.

16. The flow meter of claim 15, wherein the flow meter has a resolution of approximately 0.05 ml.

17. The flow meter of claim 1, wherein the optical sensor is configured to detect infrared light energy.

18. The flow meter of claim 17, wherein the optical sensor is configured to detect light energy having a wavelength of approximately 940 nanometers.

19. A method for measuring a volume of a fluid comprising:

providing a chamber in fluid communication with a fluid source, the chamber comprising a fluid inlet, a fluid outlet, first and second gears, and a substantially transparent wall, wherein the first gear is configured to sweep out a first area of rotation, the second gear is configured to sweep out a second area of rotation, and the first area of rotation and the second area of rotation overlap in an intersection area;

providing an optical sensor outside of the chamber, the optical sensor being positioned to detect the first gear and the second gear within the intersection area without detecting only fluid during rotation of the gears;

dispensing the fluid through the chamber causing the gears to rotate as the fluid passes through the chamber from fluid inlet to fluid outlet;

viewing the gears through the substantially transparent wall of the chamber with the optical sensor;

counting the number of rotations made by the gears with the optical sensor; and calculating the volume of fluid based upon the number of rotations made by the gears and a known chamber volume representing the volume of fluid dispensed through the chamber per rotation of the gears.

20. The method of claim 19, wherein the number of rotations of the gears can comprise partial rotations.

21. The method of claim 19, wherein the step of counting the number of rotations made by the gears comprises:

emitting light energy through the substantially transparent wall such that the light energy impinges on a detection location within the chamber and reflects back through the substantially transparent wall, wherein both of the gears pass through the detection location during rotation;

detecting the amount of the reflected light energy transmitted through the substantially transparent wall, wherein light energy reflected off of the first gear can be distinguished from light energy reflected off of the second gear;

maintaining a count of transitions between detection of light reflected off of the first gear and detection of light reflected off of the second gear; and calculating the number of rotations based upon the count of the transitions.

22. The method of claim 21, wherein the light energy is emitted and detected by the optical sensor.

23. The method of claim 21, wherein only transitions from the first gear to the second gear are counted.

24. The method of claim 21, wherein transitions from the first gear to the second gear and from the second gear to the first gear are counted.

25. The method of claim 19, wherein the step of counting the number of rotations made by the gears comprises:

emitting light energy through the substantially transparent wall such that the light energy impinges on a detection location within the chamber and reflects back through the substantially transparent wall, wherein both of the gears pass through the detection location during rotation;

detecting the amount of the reflected light energy transmitted through the substantially transparent wall, wherein light energy reflected off of a distinctive portion of one or more of the gears can be distinguished from light energy reflected off of non-distinctive portions of the gears;

maintaining a count of periods during which the light energy is reflected by the distinctive portion; and calculating the number of rotations based upon the count of the periods.

26. The method of claim 25, wherein the distinctive portion comprises one or more dots positioned on a surface of the gears such that the each of the dots pass through the detection location once per rotation.

27. The method of claim 19, further comprising:
providing one or more additional optical sensors;
viewing the gears through the substantially transparent wall of the chamber with the one or more additional optical sensors;
calculating the direction of fluid flow based upon a comparison of the output signals of the optical sensor and the one or more additional optical sensors.

* * * * *